United States Patent
Wang et al.

(10) Patent No.: US 12,551,873 B2
(45) Date of Patent: Feb. 17, 2026

(54) CARBON-BASED SOLID ACID CATALYST, PREPARATION METHOD OF CATALYST, AND APPLICATION TO HYDROTHERMAL CONVERSION OF BIOMASS

(71) Applicant: ZHEJIANG UNIVERSITY, Hangzhou (CN)

(72) Inventors: Shurong Wang, Hangzhou (CN); Shanshan Xiong, Hangzhou (CN); Hao Xu, Hangzhou (CN); Lingjun Zhu, Hangzhou (CN); Yunchao Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1091 days.

(21) Appl. No.: 17/622,262

(22) PCT Filed: May 20, 2021

(86) PCT No.: PCT/CN2021/094791
§ 371 (c)(1),
(2) Date: Dec. 23, 2021

(87) PCT Pub. No.: WO2022/134443
PCT Pub. Date: Jun. 30, 2022

(65) Prior Publication Data
US 2022/0395818 A1 Dec. 15, 2022

(30) Foreign Application Priority Data
Dec. 23, 2020 (CN) .......................... 202011536292.2

(51) Int. Cl.
*B01J 37/04* (2006.01)
*B01J 27/02* (2006.01)
(Continued)

(52) U.S. Cl.
CPC ........... *B01J 27/02* (2013.01); *B01J 37/0036* (2013.01); *B01J 37/009* (2013.01); *B01J 37/04* (2013.01);
(Continued)

(58) Field of Classification Search
CPC ...... B01J 37/0036; B01J 37/009; B01J 37/04; B01J 37/06; B01J 37/084; B01J 27/02; C07D 307/36
(Continued)

(56) References Cited

U.S. PATENT DOCUMENTS 3,256,250 A * 6/1966 Frilette ...................... C07C 1/24
526/299
4,315,998 A * 2/1982 Neckers ..................... C08F 2/48
522/904
9,884,804 B2 * 2/2018 Hood ...................... B01J 37/20

FOREIGN PATENT DOCUMENTS

CN 102614917 A 8/2012
CN 103691483 A 4/2014
(Continued)

OTHER PUBLICATIONS

Lathiya et al. "Synthesis of sulfonated carbon catalyst from waste orange peel for cost effective biodiesel production", Bioresource Technology Reports 2 (2018) 69-76.*
(Continued)

*Primary Examiner* — Cam N. Nguyen
(74) *Attorney, Agent, or Firm* — Bayramoglu Law Offices LLC (57) ABSTRACT

A carbon-based solid acid catalyst, a preparation method of the catalyst, and a method to use the catalyst for hydrothermal conversion of biomass are provided. The preparation method of the carbon-based solid acid catalyst includes the following steps: S1. mixing pectin with water, adding con-
(Continued)

centrated sulfuric acid for activation, and adding a resulting mixture to an ionic resin with an aromatic ring matrix; S2. drying a material obtained in S1, crushing a dried material into a powder, and subjecting the powder to pyrolysis in a dry inert gas; S3. subjecting a solid obtained after the pyrolysis to sulfonation with concentrated sulfuric acid; S4. diluting a material obtained in S3 with water, filtering a resulting mixture, and washing a resulting filter residue with water until no sulfate ions are detected in washing water; S5. drying the filter residue.

6 Claims, 3 Drawing Sheets

(51) Int. Cl.
*B01J 37/00* (2006.01)
*B01J 37/06* (2006.01)
*B01J 37/08* (2006.01)
*C07D 307/36* (2006.01)

(52) U.S. Cl.
CPC ............ *B01J 37/06* (2013.01); *B01J 37/084* (2013.01); *C07D 307/36* (2013.01); *B01J 2235/10* (2024.01); *B01J 2235/30* (2024.01)

(58) Field of Classification Search
USPC ........................................................ 502/418
See application file for complete search history.

(56) References Cited

FOREIGN PATENT DOCUMENTS

| CN | 106824226 A | 6/2017 |
| CN | 107501215 A | 12/2017 |
| CN | 112717953 A | 4/2021 |
| WO | 2011044282 A2 | 4/2011 |

OTHER PUBLICATIONS

Churchil A. Antonyraj, et al., A lignin-derived sulphated carbon for acid catalyzed transformations of bio-derived sugars, Catalysis Communications, 2017, pp. 101-105, vol. 104.

Zhang Xiong, et al., Preparation of Benzaldehydeby Metal Catalyst Loaded on Pectin, Guangzhou Chemical Industry, 2017, pp. 47-48, vol. 45, No. 18.

Zhou Wenjun, et al., Preparation and Suzuki Reaction Performance of Pectin-supported Palladium Catalyst, Chemical Journal of Chinese Universities, 2016, pp. 669-673, vol. 37, No. 4.

Yuanyuan Ma, et al., Biomass pectin-derived N, S-enriched carbon with hierarchical porous structure as a metal-free catalyst for enhancing bio-electricity generation, International Journal of Hydrogen Energy, 2019, pp. 1-15.

Yang Fan, et al., Bi-functional porous carbon spheres derived from pectin as electrode material for supercapacitors and support material for Pt nanowires towards electrocatalytic methanol and ethanol oxidation, Electrochimica Acta, 2015, pp. 140-148, vol. 163.

Liang Yu, et al., Preparation of Rice Husk Carbon-based Solid Acid Catalyst for the Dehydration of Xylose to Furfural, Chemical Journal of Chinese Universities, 2016, pp. 1123-1127, vol. 37, No. 6.

* cited by examiner

CARBON-BASED SOLID ACID CATALYST, PREPARATION METHOD OF CATALYST, AND APPLICATION TO HYDROTHERMAL CONVERSION OF BIOMASS

CROSS REFERENCE TO THE RELATED APPLICATIONS

This application is the national phase entry of International Application No. PCT/CN2021/094791, filed on May 20, 2021, which is based upon and claims priority to Chinese Patent Application No. 202011536292.2, filed on Dec. 23, 2020, the entire contents of which are incorporated herein by reference.

TECHNICAL FIELD

The present disclosure relates to the technical field of preparation of green energy-saving chemical materials, and mainly relates to a carbon-based solid acid catalyst prepared by using pectin rich in free radical groups as a precursor and adding an ionic resin with an aromatic ring matrix to enhance the catalytic effect. The prepared catalyst can be effectively used for common hydrothermal decomposition catalytic reactions of biomass to produce valuable platform compounds.

BACKGROUND

Due to the problems of global energy shortage and environmental pollution, people are becoming increasingly aware of the importance of environmental protection and energy conservation. Therefore, the pollution problem in the chemical industry has received more and more attention. In response to the call of "providing society with green light and heat, and returning clear water and blue sky to earth", many scientific researchers are committed to developing the green and energy-saving atom economy, advocating zero-emission reaction engineering, recommending the use of abundant and non-toxic reaction raw materials, and pursuing environmentally-friendly high-value products.

In the chemical industry, traditional homogeneous catalysts are gradually replaced by solid catalysts. Compared with homogeneous catalysts, solid catalysts can be easily separated from reactants and products and thus can be easily recovered and recycled. Moreover, heterogeneous catalysts also have the advantages of few by-products and low cost, which is of great significance to energy development and environmental protection. At present, important reaction processes, such as hydrolysis, synthesis, esterification, dehydrogenation, and alkylation, are prone to the development of green and efficient acid catalysts. Bronsted acidic (hydrochloric acid, sulfuric acid, acetic acid, bicarbonate, ammonium ion) and Lewis acidic (aluminum chloride, iron chloride, boron trifluoride, niobium pentachloride, and triflate of lanthanide) catalysts participate in a catalytic process in the form of molecules or ions, and thus can exhibit superior acidic catalytic performance at a low reaction temperature. In traditional chemical processes, liquid acidic catalysts are often used, which have a large number of active components, but will heavily corrode the equipment. Moreover, liquid acidic catalysts are difficult to recover and reuse, and also lead to the problems of many by-products and difficulty in product separation. Therefore, the combination of a support with active groups is proposed, which is a solid catalyst with the Bronsted acidity or (and) Lewis acidity, thereby forming a solid acid catalyst that is currently being used in the chemical industry and gradually replacing traditional liquid catalysts.

Although solid acid catalysts have been developed, due to the limitation of significant factors, there is still difficulty in the large-scale industrial application of solid acid catalysts. For example, supported metal oxide catalysts are often used in many important chemical processes such as hydrogenation, dehydrogenation, hydrogenolysis, synthesis, hydrolysis, and carbonylation. However, metal catalysts, especially precious metal catalysts, require expensive raw materials and high preparation costs, which limit their large-scale industrial applications. In addition, impurities in raw materials of reaction and solid by-products are easily deposited on the surface of the catalyst, causing the catalyst deactivation. A fine powder catalyst is easy to lose during a recovery process, leading to reduced recycling performance of the catalyst. In addition, active groups are artificially loaded, and the number of catalytic centers is limited, resulting in limited activity. In recent years, in order to reduce the high cost of metal catalysts, avoid the loss of powder catalysts, and improve the performance of acid catalysts, carbon-based solid acid catalysts have been rapidly developed. The carbon-based catalyst is obtained by incompletely carbonizing an aromatic hydrocarbon or carbohydrate to form a stable polycyclic aromatic hydrocarbon (PAH) and subsequently loading acidic active centers through sulfonation. In the carbon-based catalyst, a sulfonate group is linked to the PAH through a covalent bond, which can not only achieve high-strength acidity similar to sulfuric acid, but also provides stable sulfonate group grafting. The carbon-based catalyst is a green and energy-saving solid sulfonate material with huge application potential.

SUMMARY

The present disclosure is intended to solve the problems in the art, and provide a carbon-based solid acid catalyst, a preparation method of the catalyst, and applications of the catalyst in hydrothermal conversion of biomass. Pectin rich in active groups is used as a carbon-based precursor and an ionic resin with aromatic ring structure is used to strengthen the performance to prepare the carbon-based solid acid catalyst, which can realize the catalytic conversion of biomass into high-value platform compounds under mild conditions through hydrothermal decomposition reaction.

In order to achieve the above objective, the present disclosure provides a preparation method of a carbon-based solid acid catalyst, where pectin is used as a carbon-based precursor. And the pectin and ionic resins with aromatic ring matrix are mixed in a medium, then dried, and subjected to pyrolysis and sulfonation with concentrated sulfuric acid to obtain the carbon-based solid acid catalyst.

Preferably, the preparation method may specifically include the following steps:
S1. mixing the pectin with water, adding sulfuric acid for activation, and adding a resulting mixture to the ionic resin with aromatic ring matrix;
S2. drying a material obtained in S1, crushing a dried material into a powder, and subjecting the powder to pyrolysis in a dry inert gas;
S3. subjecting a solid obtained after the pyrolysis in S2 to sulfonation with the concentrated sulfuric acid;
S4. diluting a material obtained in S3 with water, filtering a resulting mixture, and washing a resulting filter residue with water until no sulfate ions are detected in washing water;

S5. drying the filter residue.

Preferably, the preparation method may specifically include the following steps:

S1. mixing the pectin with water in a mass ratio of 1:(4-10), adding sulfuric acid for activation, and adding a resulting mixture to the ionic resin with aromatic ring matrix, where a mass ratio of the ionic resin to the pectin is 1:(0.5-3);

S2. drying a material obtained in S1, crushing a dried black material into a powder, and subjecting the powder to pyrolysis for 0.5 h to 3 h in a dry inert gas;

S3. subjecting a solid obtained after the pyrolysis in S2 to sulfonation with the concentrated sulfuric acid at 20° C. to 120° C.;

S4. diluting a material obtained in S3 with water, filtering a resulting mixture, and washing a resulting filter residue with water until no sulfate ions are detected in washing water;

S5. oven-drying the filter residue.

Preferably, in S1, the sulfuric acid has a mass fraction of 98%, and a volume ratio of the sulfuric acid to the water may be 1:30. The present disclosure has no specific limitations on the pectin, and commercially available dry pectin and any freshly-prepared moist pectin may be used. Preferably, the pectin may be fruit pectin, including one or more from the group consisting of orange peel pectin, pomelo peel pectin, lemon peel pectin, apple pectin, and banana peel pectin.

Preferably, in S2, the material obtained in S1 may be dried to a constant weight at 110° C. to 120° C. The pyrolysis may be conducted in a horizontal tube furnace. And the inert gas may be nitrogen. The pyrolysis may be conducted at 300° C. to 800° C. for 1 h to 2 h, and preferably may be conducted at 300° C. for 1 h.

Preferably, in S3, a mass ratio of the solid obtained after the pyrolysis in S2 to the concentrated sulfuric acid may be 1:(3-8). The concentrated sulfuric acid may be used to conduct sulfonation at 80° C. for 10 h to 48 h (preferably 24 h) in an oil bath with magnetic stirring. And the concentrated sulfuric acid may have a mass fraction of 98%.

Preferably, the ionic resin with aromatic ring matrix may include one or more from the group consisting of sulfonated styrene-divinylbenzene cation-exchange resin and chloromethylated polystyrene resin. The sulfonated styrene-divinylbenzene cation-exchange resin may preferably be Amberlyst 15 and 732 strongly-acidic styrene cation-exchange resin. The chloromethylated polystyrene resin may preferably be Merrifield peptide resin.

Preferably, in S5, the drying may be conducted in an oven at a temperature preferably of 80° C.

In addition, the present disclosure also provides a carbon-based solid acid catalyst prepared by the method described above. The catalyst particles are distinct, not easy to lose, and easy to recover.

The present disclosure also provides an application of a carbon-based solid acid catalyst prepared by the method described above for hydrothermal conversion of biomass, which includes mixing the carbon-based solid acid catalyst with a biomass or a carbohydrate in a solvent system to conduct the hydrothermal conversion to obtain a furan platform compound.

Preferably, the method may include mixing the carbon-based solid acid catalyst with the biomass in the solvent system to conduct the hydrothermal conversion, where the mass ratio of the carbon-based solid acid catalyst to the biomass may be 1:(1-10). The hydrothermal conversion may be conducted at 120° C. to 190° C. for 0.5 h to 3 h. After the mixing, the feedstock may have a concentration of 0.012 g/ml to 0.32 g/ml. And the solvent system may be an organic solvent or water, or a mixture of the two.

Preferably, the organic solvent may include one or more from the group consisting of γ-valerolactone (GVL), dimethyl sulfoxide (DMSO), isopropyl alcohol (IPA), methyl isobutyl ketone (MIBK), tetrahydrofuran (THF), and N,N-dimethylformamide (DMF).

Preferably, when a biphasic solvent system with water and an organic solvent is used, the product yield may be further improved by adding chloride salt. And the chloride salt may include one or more from the group consisting of sodium chloride, potassium chloride, copper chloride, and aluminum chloride.

Preferably, the biomass may include one or more from the group consisting of glucose, xylose, arabinose, cellobiose, inulin, corn starch, peel, and crop straw. And the carbohydrate may include one or more from the group consisting of glucose, xylose, disaccharide, and polysaccharide.

Preferably, the furan platform compound may be furfural or 5-(hydroxymethyl)furfural.

The present disclosure is intended to provide a preparation method of a carbon-based solid acid catalyst, where pectin that is rich in active groups and has weak acidity itself is used as a precursor and an ionic resin with aromatic ring structure is used to enhance performance to prepare the carbon-based solid acid catalyst. In view of the shortcomings of existing carbon-based catalysts in the hydrothermal decomposition catalytic reaction of biomass, including low activity of the support, limited number of grafted acidic active groups, and optimizable catalyst activity, the present disclosure provides use of the prepared carbon-based solid acid catalyst to realize the hydrothermal decomposition catalytic conversion of biomass in a solvent system based on organic solvents under mild conditions to obtain high-value platform compounds. Pectin includes a large amount of galacturonic acid, which has a considerable number of carboxyl groups and weak acidity itself. In the hydrothermal decomposition of biomass, active sites with strong and weak acidities each play an important role. Therefore, one of the biggest advantages of using pectin as an acid catalyst is the use of its own weak acidity.

The present disclosure has the following beneficial effects:

1. A furfural yield of 85 mol. % can be achieved.
2. The present disclosure is suitable for a variety of reaction parameters, and a furfural yield of 70 mol. % can be achieved at 140° C. to 180° C.
3. A catalyst recovery rate is close to 90%.

The present disclosure has the following advantages:

1. The catalyst particles are distinct, which is not easy to lose and easy to recover.
2. The catalyst can also exhibit high performance in an aqueous phase. Sodium chloride can be added to separate an aqueous phase and an organic phase, and improve the catalytic performance, while the aqueous phase and sodium chloride can be recycled.
3. The carbonization temperature is relatively low, and the preparation process is green and environmentally friendly.
4. Pectin that is rich in active groups and has weak acidity is used as a precursor to prepare a catalyst support, which can not only achieve effective active group grafting, but also provide weak acidity for a hydrothermal decomposition process.
5. The prepared catalyst can realize the hydrothermal conversion of both pentose and hexose, thereby realizing the purpose of preparing a high-value platform compound.

6. The preparation process is simple and convenient for large-scale production.

The features and advantages of the present disclosure are described in detail through examples with reference to accompanying drawings.

DETAILED DESCRIPTION OF THE EMBODIMENTS

In the present disclosure, pectin with a large number of active groups is used as the carbon-based precursor, and an ionic resin with aromatic ring structure as a matrix is added to expand the liquid phase and improve the availability of acidic sites on the surface of a solid acid. And anaerobic carbonization is conducted at 300° C. to 800° C., and the product is ground and then subjected to sulfonation with concentrated sulfuric acid to obtain a highly-active carbon-based solid acid catalyst with strong adaptability and prominent recovery performance. According to existing patent technologies and literature reports, there is no technology similar to the present disclosure that uses the same carbon source to prepare a carbon-based solid acid catalyst through the combination of an ionic resin with aromatic ring matrix and a pectin carbon-based support. The catalyst prepared by the present disclosure has a significantly-improved effect, and can exhibit prominent catalytic performance under various reaction conditions. Moreover, the catalyst is not easy to coke, which has distinct particles and is easy to recycle. Specific effects will be described in detail in the examples.

The present disclosure provides a preparation method of a carbon-based solid acid catalyst, where pectin is used as the carbon-based precursor. And the pectin and an ionic resin with aromatic ring matrix are mixed in a medium, then dried, and subjected to pyrolysis and sulfonation with concentrated sulfuric acid to obtain the carbon-based solid acid catalyst. The preparation method may include the following steps:

S1. mixing the pectin with water, adding sulfuric acid for activation, and adding a resulting mixture to the ionic resin of the aromatic ring matrix;

S2. drying a material obtained in S1, crushing a dried material into a powder, and subjecting the powder to pyrolysis in a dry inert gas;

S3. subjecting a solid obtained after the pyrolysis in S2 to sulfonation with the concentrated sulfuric acid;

S4. diluting a material obtained in S3 with water, filtering a resulting mixture, and washing a resulting filter residue with water until no sulfate ions are detected in washing water;

S5. drying the filter residue.

Further, the preparation method may specifically include the following steps:

S1. mixing the pectin with water in a mass ratio of 1:(4-10), adding sulfuric acid for activation, and adding a resulting mixture to the ionic resin with aromatic ring matrix, where a mass ratio of the ionic resin to the pectin is 1:(0.5-3); the sulfuric acid has a mass fraction of 98%; and the pectin is fruit pectin, including one or more from the group consisting of orange peel pectin, pomelo peel pectin, lemon peel pectin, apple pectin, and banana peel pectin;

S2. drying a material obtained in S1 to a constant weight at 110° C. to 120° C., crushing a dried black material into a powder, and subjecting the powder to pyrolysis in a horizontal tube furnace at 300° C. to 800° C. for 0.5 h to 3 h in a dry inert gas;

S3. subjecting a solid obtained after the pyrolysis in S2 to sulfonation with the concentrated sulfuric acid at 20° C. to 120° C.;

S4. diluting a material obtained in S3 with water, filtering a resulting mixture, and washing a resulting filter residue with water until no sulfate ions are detected in washing water;

S5. oven-drying the filter residue.

Further, in S2, the inert gas may be nitrogen, and the pyrolysis may be conducted at 300° C. for 1 h.

Further, in S3, the mass ratio of the solid obtained after the pyrolysis in S2 to the concentrated sulfuric acid may be 1:(3-8). The concentrated sulfuric acid may be used to conduct sulfonation at 80° C. for 10 h to 48 h in an oil bath with magnetic stirring. And the concentrated sulfuric acid may have a mass fraction of 98%.

Further, the ionic resin with aromatic ring matrix may include one or more from the group consisting of sulfonated styrene-divinylbenzene cation-exchange resin and chloromethylated polystyrene resin.

In addition, the present disclosure also provides a carbon-based solid acid catalyst prepared by the preparation method described above.

The present disclosure also provides a method to use a carbon-based solid acid catalyst prepared by the preparation method described above for hydrothermal conversion of biomass, including mixing the carbon-based solid acid catalyst with a biomass raw material or a carbohydrate in a solvent system to conduct the hydrothermal conversion to obtain a furan platform compound.

The method may specifically include mixing the carbon-based solid acid catalyst with the biomass in the solvent system to conduct the hydrothermal conversion, where a mass ratio of the carbon-based solid acid catalyst to the biomass may be 1:(1-10). The hydrothermal conversion may be conducted at 120° C. to 190° C. for 0.5 h to 3 h. After the mixing, the feedstock may have a concentration of 0.012 g/ml to 0.32 g/ml. And the solvent system may be an organic solvent or water, or a mixture of the two. The organic solvent may include one or more from the group consisting of GVL, DMSO, IPA, MIBK, THF, and DMF. The biomass may include one or more from the group consisting of glucose, xylose, arabinose, cellobiose, inulin, corn starch, peel, and crop straw. And the carbohydrate may include one or more from the group consisting of glucose, xylose, disaccharide, and polysaccharide. The furan platform compound may be furfural or 5-(hydroxymethyl)furfural.

Furthermore, when a biphasic solvent system of water and an organic solvent is used, the product yield may be further improved by adding chloride salt. And the chloride salt may include one or more from the group consisting of sodium chloride, potassium chloride, copper chloride, and aluminum chloride.

In order to explain the content of the present disclosure more clearly, the following examples are described in detail. However, the present disclosure is not limited to the examples, that is, the examples should not limit the protection scope of the present disclosure.

Example 1

8 g of dried orange peel pectin was mixed with 30 ml of deionized water. 1 ml of concentrated sulfuric acid (98%) was added, and then a resulting mixture was slowly added to 8 g of pre-dried Amberlyst 15 ionic resin. A resulting mixture was dried at 110° C. to 120° C. for 48 h, and a resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. The black solid was washed with deionized water several times until no sulfate ions were detected in washing water. The black solid was dried in an oven at 80° C. for 24 h. 0.05 g of a dried black solid was added to a 10 ml test tube, then 0.1 g of xylose and 5 ml of GVL were added, and a reaction was conducted for 1 h under microwave heating, where at a reaction temperature of 140° C. to 180° C. The furfural yield was higher than 71 mol. %, and the highest yield could reach 85 mol. %.

Figure 1:
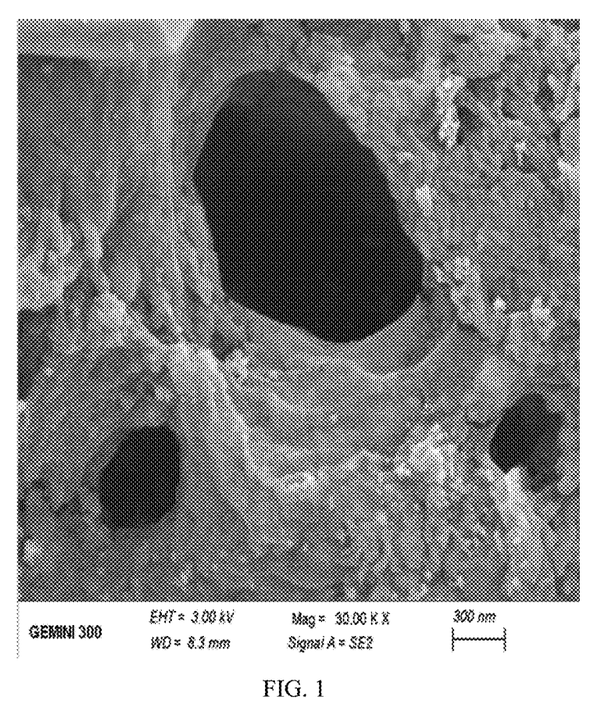
FIG. 1 is an electron microscopy image of the carbon-based solid acid catalyst prepared in Example 1 of the present disclosure at a magnification of 30,000.
Figure 2:
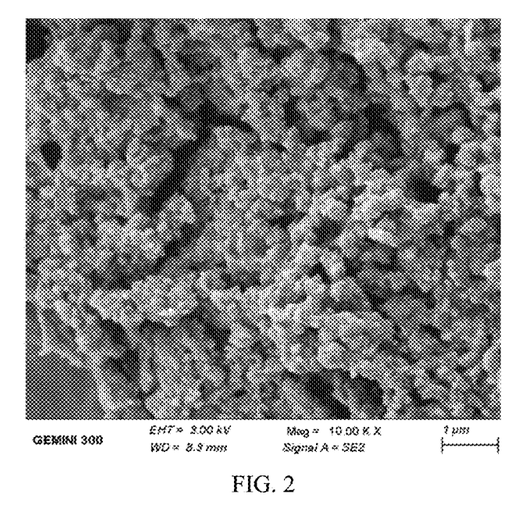
FIG. 2 is an electron microscopy image of the carbon-based solid acid catalyst prepared in Example 1 of the present disclosure at a magnification of 10,000.
Figure 3:
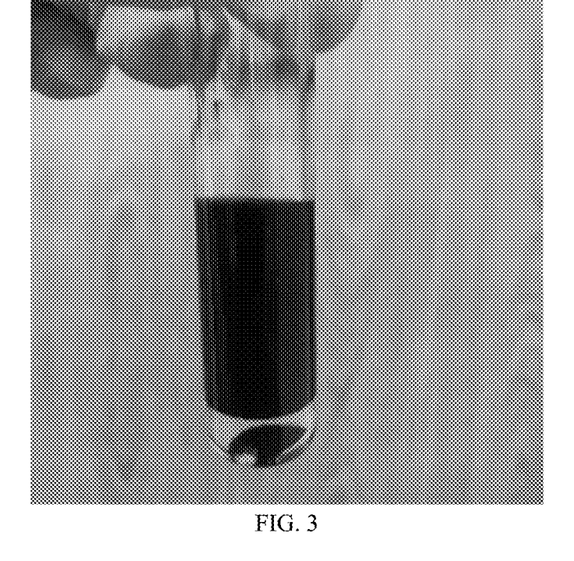
FIG. 3 shows a biphasic solvent system after a reaction, where the organic phase is GVL; 0.16 g of sodium chloride is added to the aqueous phase for separation; and a ratio of the organic phase to the aqueous phase is 4:1 (ml).

From the electron microscopy images of FIG. 1 and FIG. 2, it can be seen that the catalyst prepared by the present disclosure has well-developed pore structures including a large number of microporous, mesoporous, and macroporous structures, which are very conducive to the grafting of active groups and the conversion of reactants. And structural units are clear and regular, which is conducive to the acidity control of a catalyst. Therefore, it is confirmed that pectin is easy to form reasonable pore structures when used as a carbon-based support, indicating the advantages and application potential of pectin as a solid acid carbon-based support.

Figure 4:
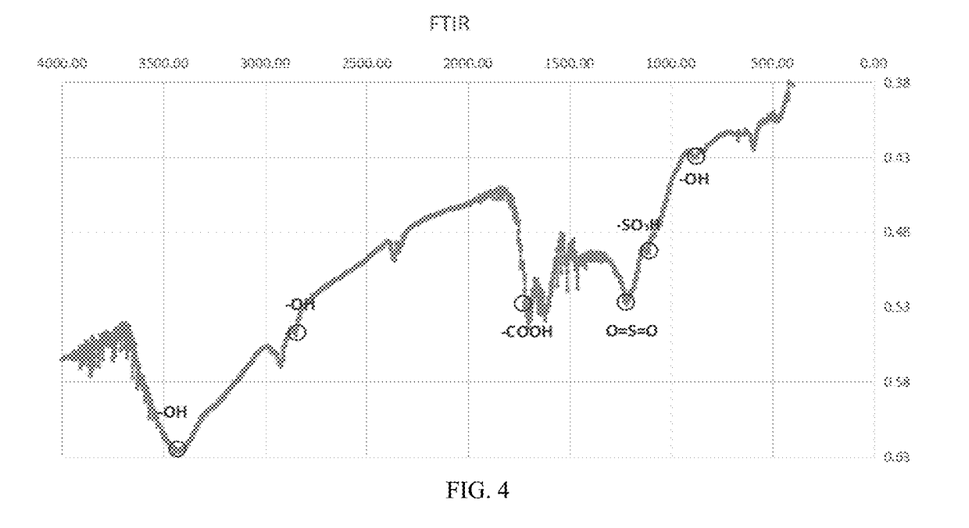
FIG. 4 is an infrared spectroscopy of the carbon-based solid acid catalyst prepared in Example 1 of the present disclosure.

With reference to FIG. 4, the infrared spectroscopy shows that the catalyst includes a large amount of —OH, and it is believed that these hydroxyl groups are mainly derived from a large number of active groups on the surface of pectin. The catalyst also includes a large number of weakly-acidic groups —COOH, and the catalyst is also successfully grafted with a considerable number of O=S=O and —$SO_3H$ groups, which confirms that, when pectin is used as a solid acid carbon-based support, the weak acidity and the large number of active groups of pectin are very conducive to the preparation of an acid catalyst and the grafting and reasonable distribution of acidic sites.

TABLE 1

| Catalyst type | Surface acid concentration (mmol/g) 1 | Surface acid concentration (mmol/g) 2 | Surface acid concentration (mmol/g) 3 |
|---|---|---|---|
| Pectin | 0.15 | 0.11 | 0.09 |
| Pectin carbon-based solid acid | 1.35 | 1.43 | 1.37 |

Table 1 shows acidity of the catalyst prepared in Example 1 of the present disclosure and acidity of pure pectin. The results not only show that the catalyst prepared by the present disclosure has reasonable acidity, but also confirm that the pectin itself has some weak acidity, which is conducive to the preparation of a carbon-based solid acid.

Example 2

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 100° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose and 5 ml of GVL were added, and a reaction was conducted for 1 h under microwave heating, where at a reaction temperature of 130° C. The furfural yield was 57.6 mol. %.

Example 3

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 450° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose and 5 ml of GVL were added, and a reaction was conducted for 1 h under microwave heating, where at a reaction temperature of 190° C. The furfural yield was 69.8 mol. %.

Example 4

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 800° C. for 0.5 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose, 2 ml of GVL, and 3 ml of deionized water were added, and a reaction was conducted for 1 h under microwave heating, where at a reaction temperature of 170° C. The furfural yield was 52.9 mol. %.

Example 5

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 3 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of a dried black solid was added to a 10 ml test tube, then 0.1 g of xylose, 4 ml of GVL, 1 ml of deionized water, and 0.16 g of NaCl were added, and a reaction was conducted for 1 h under microwave heating, where at a reaction temperature of 170° C. The furfural yield was 70.6 mol. %.

Example 6

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 36 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of a dried black solid was added to a 10 ml test tube, then 0.1 g of xylose and 5 ml of DMSO were added, and a reaction was conducted for 1 h under microwave heating, where at a reaction temperature of 170° C. The furfural yield was 74.3 mol. %.

Example 7

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 2 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of a dried black solid was added to a 10 ml test tube, then 0.16 g of xylose and 5 ml of DMSO were added, and a reaction was conducted for 1 h under microwave heating, where at a reaction temperature of 170° C. The furfural yield was 69.2 mol. %.

Example 8

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 20° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.10 g of arabinose and 5 ml of DMSO were added, and a reaction was conducted for 1 h under microwave heating, where at a reaction temperature of 170° C. The furfural yield was 32.09 mol. %.

Example 9

8 g of dried orange peel pectin was mixed with 30 ml of deionized water, and then 1 ml of concentrated sulfuric acid (98%) was added. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose and 5 ml of GVL were added. And a reaction was conducted for 1 h under microwave heating, where at a reaction temperature of 170° C. The furfural yield was 77.6 mol. %.

Example 10

2 g of dried apple pectin was mixed with 20 ml of deionized water, and 1 ml of concentrated sulfuric acid (98%) was added. The resulting mixture was slowly added to 4 g of pre-dried 732 strongly-acidic styrene cation-exchange resin. The resulting mixture was dried at 110° C. to 120° C. for 24 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain the black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of arabinose and 5 ml of GVL were added, and a reaction was conducted for 2 h under microwave heating, where at a reaction temperature of 170° C. The furfural yield was 17.1 mol. %.

Example 11

2 g of dried apple pectin was mixed with 15 ml of deionized water, and 1 ml of concentrated sulfuric acid (98%) was added. The resulting mixture was slowly added to 1 g of pre-dried Amberlyst ionic resin. The resulting mixture was dried at 110° C. to 120° C. for 24 h, and a resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 10 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of glucose, 4 ml of THF, 1 ml of deionized water, and 0.16 g of NaCl were added, and a reaction was conducted for 1 h under microwave heating, where at a reaction temperature of 160° C. The 5-hydroxymethyl furfural yield was 33.1 mol. %.

Example 12

2 g of dried citrus pectin was mixed with 20 ml of deionized water, and 1 ml of concentrated sulfuric acid (98%) was added. The resulting mixture was slowly added to 8 g of pre-dried 732 strongly-acidic styrene cation-exchange resin. The resulting mixture was dried at 110° C. to 120° C. for 24 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 90° C. for 48 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of a dried black solid was added to a 10 ml test tube, then 0.15 g of xylose and 5 ml of DMSO were added, and a reaction was conducted for 1 h under microwave heating, where at a reaction temperature of 170° C. The furfural yield was 48.8 mol. %.

Example 13

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/3 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.01 g of a dried black solid was added to a 10 ml test tube, then 0.1 g of xylose and 5 ml of GVL were added, and a reaction was conducted for 1 h under microwave heating, where at a reaction temperature of 170° C. The furfural yield was 68.5 mol. %.

Example 14

8 g of dried orange peel pectin was mixed with 30 ml of deionized water, 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid, and the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose and 5 ml of GVL were added, and a reaction was conducted for 0.5 h under microwave heating, where at a reaction temperature of 170° C. The furfural yield was 70.6 mol. %.

Example 15

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose, 4 ml of GVL, 1 ml of deionized water, and 0.16 g of NaCl were added, and a reaction was conducted for 1 h under microwave heating, where at a reaction temperature of 170° C. The furfural yield was 68.7 mol. %.

Example 16

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose and 5 ml of GVL were added, and a reaction was conducted for 3 h under microwave heating, where at a reaction temperature of 170° C. The furfural yield was 65.5 mol. %.

Example 17

8 g of dried orange peel pectin was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and the resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid. And the black solid was washed with deionized water several times until no sulfate ions were detected in washing water. The black solid was dried in an oven at 80° C. for 24 h. 0.05 g of a dried black solid was added to a 10 ml test tube, then 0.1 g of xylose, 4 ml of GVL, 1 ml of deionized water, and 0.08 g of NaCl were added, and a reaction was conducted for 1 h under microwave heating, where at a reaction temperature of 170° C. The furfural yield was 66.7 mol. %.

Example 18

20 g of fresh citrus peel (8 g of dry product) was weighed, washed with clean water, and placed in a 250 ml beaker, then 120 ml of water was added, and the beaker was heated to 90° C. and kept at the temperature for 5 min to 10 min to achieve enzymatic deactivation. The citrus peel was rinsed with water, cut into 3 to 5 mm particles, and then rinsed with hot water at about 50° C. until rinsing water was colorless and the peel had no peculiar smell. After each rinse, the peel was squeeze-dried with nylon cloth, and then the next rinse was conducted. Treated peel particles were placed in a beaker, then 0.2 mol/L hydrochloric acid was added to immerse the peel particles, and a pH of a resulting mixture was adjusted to 2.0 to 2.5. The mixture was heated to 90° C. and kept in a constant-temperature water bath for 40 min, during which the mixture was stirred continuously. And a Buchner funnel lined with nylon cloth (100 mesh) was used to filter a resulting mixture while hot to obtain a filtrate. 0.5% to 1% activated carbon was added to the filtrate, and the resulting mixture was heated to 80° C., subjected to decolorization for 20 min, and then subjected to suction filtration while hot (if the citrus peel is thoroughly rinsed and the filtrate was clear, the decolorization is not necessary). The resulting filtrate was cooled, the pH was adjusted to 3 to 4 with 6 mol/L ammonia water, and a 95% alcohol solution was slowly added under constant stirring. A volume of added ethanol was 1.5 times a volume of the original filtrate (to make a mass fraction of alcohol reach 50% to 60%). A pectin-like substance was precipitated during the process of adding the alcohol. After standing for 20 min, the resulting mixture was filtered with nylon cloth. And the resulting filter residue was transferred to a 100 ml beaker, 30 ml of absolute ethanol was added for washing, and then the filter residue was filtered out with nylon cloth and squeezed to obtain wet pectin. 9 g of wet pectin prepared (or 8 g of dry pectin, which was prepared as follows: the wet pectin was spread in a watch glass, dried at 60° C. to 70° C., and ground and sieved to obtain the dry pectin) was mixed with 30 ml of deionized water, and 1 ml of concentrated sulfuric acid (98%) was added. The resulting mixture was slowly added to 8 g of pre-dried Amberlyst 15 ionic resin. The resulting mixture was dried at 110° C. to 120° C. for 48 h, and a resulting black material was subjected to pyrolysis in a horizontal tube furnace at 300° C. for 1 h in dry nitrogen. Sulfonation was conducted with concentrated sulfuric acid (1 g solid/5 g $H_2SO_4$) at 80° C. for 24 h in an oil bath with magnetic stirring. The resulting material was diluted with a large amount of deionized water, and filtered to obtain a black solid, and the black solid was washed with deionized water several times until no sulfate ions were detected in washing water. The black solid was dried in an oven at 80° C. for 24 h. 0.05 g of the dried black solid was added to a 10 ml test tube, then 0.1 g of xylose and 5 ml of GVL were added, and a reaction was conducted for 1 h under microwave heating, where at a reaction temperature of 180° C. The furfural yield was 71 mol. %.

Comparative Example 1

Literature (Antonyraj C A, Haridas A. Catalysis Communications, 2018, 104: 101-105): Crude lignin was subjected to pyrolysis in a vertical tube furnace at 450° C. for 1 h in a nitrogen atmosphere. 3 g of a pyrolysis solid product was added to a 150 ml round-bottom flask, then 100 ml of concentrated sulfuric acid (98%) was added, and the resulting mixture was magnetically stirred at 60° C. for 18 h in an oil bath. The resulting material was diluted with a large amount of deionized water, and filtered to obtain a black solid, and the black solid was washed with deionized water several times until no sulfate ions were detected in washing water. The black solid was dried to a constant weight in an oven at 100° C. 12 ml of a 6.67 wt. % xylose solution (equivalent to 0.08 g of xylose) and 28 ml of MIBK were taken and mixed with 0.2 g of the catalyst obtained above, and a resulting mixture was subjected to a reaction at 175° C. for 3 h. The furfural yield was 58.8 mol. %.

Comparative Example 2

Literature (Wang Li, Zhang Zhu. Guangzhou Chemical Industry. 2017, 45 (18): 47-48) and literature (Zhou Wenjun, Zhou Yu, Zhang Xiazhong, Zeng Bin. Chemical Journal of Chinese Universities. 2016, 37 (4): 669-673): Pectin was used as a support to prepare a catalyst, and pectin was allowed to adsorb active groups through impregnation, which was completely different from the preparation method of using pectin as a carbon-based precursor in the present disclosure. In addition, pectin exhibited no catalytic effect on the reaction itself. Through the weak acidity of pectin itself, the present disclosure strengthens the acidity strength of the catalyst system and optimizes the strong and weak acidic site distribution of the catalyst. The catalysts obtained in the comparative literatures are used in the oxidation of benzaldehyde into benzoic acid and the Suzuki reaction, respectively, which are completely different from the hydrothermal conversion of biomass in which the catalyst prepared in the present disclosure is used.

Comparative Example 3

Literature (Ma Y, You S, Jing B, et al. International journal of hydrogen energy. 2019, 44 (31): 16624-16638) and literature (Fan Y, Liu P, Yang Z, et al. Electrochimica acta. 2015, 163: 140-148): Pectin was used as a carbon source to prepare an electrode material, where the gelation, emulsification, and stabilization functions of pectin were beneficial to the introduction of a silica template and a Fe species to form a porous structure. Therefore, the product in the comparative literature is used in a scenario completely different from that of the present disclosure. The present disclosure fully utilizes the physical property that pectin is easy to form a porous structure and the chemical properties of weak acidity and abundant surface active groups, which realizes the comprehensive utilization of pectin. The carbon-based solid acid catalyst prepared by the present disclosure can not only optimize the acidic site distribution, but also ensure sufficiently-developed pore structures and abundant free radicals, which is very conducive to the grafting of active groups.

Comparative Example 4

Figure 5:
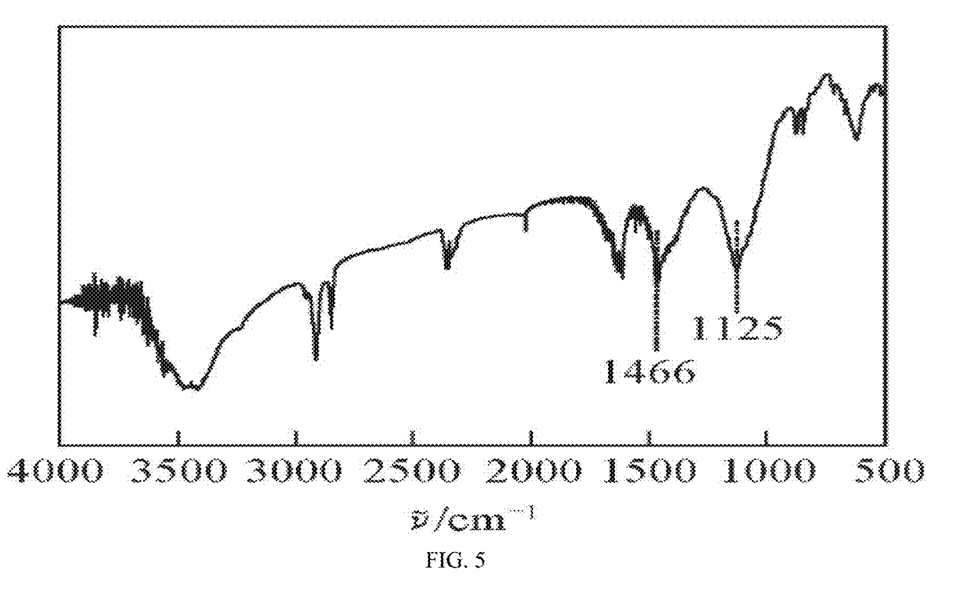
FIG. 5 is an infrared spectroscopy of the catalyst in Comparative Example 4.

Literature (Liang Yu, Chen Zhihao, Liang Baoyan, etc. Chemical Journal of Chinese Universities, 2016, 37 (6): 1123-1127): A pyrolysis product of rice husk was used as a support to prepare a carbon-based solid acid catalyst, and the catalyst was used to catalyze the hydrothermal conversion of xylose into furfural. FIG. 5 is an FTIR spectrum of the catalyst, and compared with the FTIR spectrum of the present disclosure (FIG. 4), the characteristic peaks of active groups are not as obvious as that of the present disclosure, especially the characteristic peak of —OH. The catalytic effect is also proved to be worse than that of the present disclosure. At 180° C., the catalyst of this comparative example can lead to a maximum yield of 75.8% at 8 h. And at 170° C., the catalyst prepared by the present disclosure can lead to a furfural yield of 85% at 1 h. This also further proves the superiority of using pectin as a carbon-based solid acid support.

The above examples are provided to illustrate the present disclosure, but not to limit the present disclosure. Any solution obtained by making a simple modification to the present disclosure shall fall within the protection scope of the present disclosure.

What is claimed is:

1. A method for preparation of a carbon-based solid acid catalyst, comprising:
    S1) mixing a pectin and an ionic resin with an aromatic ring matrix in a medium to obtain a first resulting mixture, wherein the pectin is used as a carbon-based precursor, wherein S1 comprises:
        mixing the pectin with water, adding sulfuric acid for an activation to obtain a second resulting mixture, and adding the second resulting mixture to the ionic resin with the aromatic ring matrix to obtain the first resulting mixture;
    S2) drying the first resulting mixture obtained in S1 to obtain a dried material, crushing the dried material into a powder, and subjecting the powder to a pyrolysis in a dry inert gas to obtain a solid;
    S3) subjecting the solid obtained after the pyrolysis in S2 to a sulfonation with concentrated sulfuric acid to obtain a material;
    S4) diluting the material obtained in S3 with water to obtain a third resulting mixture, filtering the third resulting mixture to obtain a resulting filter residue, and washing the resulting filter residue with water until no sulfate ions are detected in washing water;
    S5) drying the resulting filter residue to obtain the carbon-based solid acid catalyst.

2. The method for preparation according to claim 1, wherein the ionic resin with the aromatic ring matrix comprises one or more from the group consisting of a sulfonated styrene-divinylbenzene cation-exchange resin and a chloromethylated polystyrene resin.

3. A method for preparation of a carbon-based solid acid catalyst, comprising:
    S1) mixing a pectin and an ionic resin with an aromatic ring matrix in a medium to obtain a first resulting mixture, wherein the pectin is used as a carbon-based precursor, wherein S1 comprises:
        mixing the pectin with water in a mass ratio of 1:(4-10), adding sulfuric acid for an activation to obtain a second resulting mixture, and adding the second resulting mixture to the ionic resin with the aromatic ring matrix to obtain the first resulting mixture, wherein a mass ratio of the ionic resin to the pectin is 1:(0.5-3);
    S2) drying the first resulting mixture obtained in S1 to obtain a dried black material, crushing the dried black material into a powder, and subjecting the powder to a pyrolysis for 0.5 h to 3 h in a dry inert gas to obtain a solid;
    S3) subjecting the solid obtained after the pyrolysis in S2 to a sulfonation with concentrated sulfuric acid at 20° C. to 120° C. to obtain a material;
    S4) diluting the material obtained in S3 with water to obtain a third resulting mixture, filtering the third resulting mixture to obtain a resulting filter residue, and washing the resulting filter residue with water until no sulfate ions are detected in washing water; and
    S5) oven-drying the resulting filter residue to obtain the carbon-based solid acid catalyst.

4. The method for preparation according to claim 3, wherein in S1, the pectin comprises one or more from the group consisting of an orange peel pectin, a pomelo peel pectin, a lemon peel pectin, an apple pectin, and a banana peel pectin.

5. The method for preparation according to claim 3, wherein in S2, the dry inert gas is nitrogen, and the pyrolysis is conducted at 300° C. to 800° C. for 1 h to 2 h.

6. The method for preparation according to claim 3, wherein in S3, a mass ratio of the solid obtained after the pyrolysis in S2 to the concentrated sulfuric acid is 1:(3-8); and the sulfonation is conducted at 80° C. for 10 h to 48 h.

* * * * *